Jan. 15, 1963  A. J. WESOLOWSKI  3,073,976
END STRUCTURE FOR DYNAMOELECTRIC MACHINE
Filed Jan. 20, 1960  2 Sheets-Sheet 1

INVENTOR.
ADOLPH J. WESOLOWSKI
BY
Vernon F. Kalb
ATTORNEY

Jan. 15, 1963     A. J. WESOLOWSKI     3,073,976
END STRUCTURE FOR DYNAMOELECTRIC MACHINE
Filed Jan. 20, 1960     2 Sheets-Sheet 2

INVENTOR.
ADOLPH J. WESOLOWSKI
BY
Vernon J. Kalb
ATTORNEY

United States Patent Office 3,073,976
Patented Jan. 15, 1963

3,073,976
END STRUCTURE FOR DYNAMOELECTRIC MACHINE
Adolph J. Wesolowski, Phoenix, Ariz., assignor to General Electric Company, a corporation of New York
Filed Jan. 20, 1960, Ser. No. 3,644
5 Claims. (Cl. 310—59)

This invention relates to dynamoelectric machines, and more particularly relates to an end structure for a generator designed for installation on an airborne vehicle.

Dynamoelectric machines used on airborne vehicles to supply electrical power for the aircraft accessories are subjected to a variety of adverse operating conditions and must meet specification requirements not encountered in normal dynamoelectric machine usage. For example, a generator designed to furnish electrical power for aircraft accessories must be compact in size and light in weight, since both space and weight are premium considerations in airborne vehicles. Therefore, a relatively large output is desired from a relatively small generator. For example, a generator weighing less than 100 pounds may have to meet a specification and operating requirement of 90 kilovolt-amperes (k.v.a.). It will be apparent that when such a large output is required from a small generator confined within an aircraft that ventilation and cooling of the generator becomes a significant problem. To dissipate and remove the heat energy produced in the generator, an opening may be provided in one end of the generator to allow an impinging air stream to pass through the generator to provide efficient heat exchange and cooling of the generator to prevent excessive heating and eventual deterioration of insulation.

The cooling air stream is derived from the air stream impinging on the aircraft. This impinging air stream is usually carried to an opening in the end of the generator and directed through the generator at a high velocity to provide an efficient heat exchange medium. Although this rapid flow of air over the surfaces of the rotor and stator adequately removes heat generated thereby, the flow of air over the brush rigging may have an adverse effect thereon.

The brushes and brush rigging are located on the shaft adjacent the opening admitting the cooling air stream and heat generated in the electrical circuits of the generator is carried away from the brushes and brush rigging. Inasmuch as very little heat is generated at the brushes, the high velocity air stream impinging thereon maintains the brushes and brush rigging at a low temperature. When moisture is present on the brush rigging, the cooling effect of the air stream is likely to cause freezing of the moisture and result in freezing of the brushes in the brush holders leading to lack of contact of the brushes and the collector means and failure of the generator to deliver an electrical output.

Moisture may be accumulated on and in the brush rigging in a variety of ways. It may be splashed into the generator while the aircraft is taxiing, it may condense on the rigging in locations of high humidity, or it may be entrained in the air. Additionally, it may be carried into the generator with the cooling air stream if the aircraft should fly through rain. Once moisture is accumulated on the brushes and brush rigging and the aircraft rapidly gains altitude, the temperature at the brushes, due to the decrease in ambient temperature with increase in altitude and the cooling effect of the high velocity of air stream, falls fast and icing results, causing freezing of the brushes in the brush holders.

It is therefore a primary object of my invention to provide an improved ventilating structure for a dynamoelectric machine which enhances the flow of air through the generator for purposes of cooling and ventilation but which shields the brushes and brush holders from contact by splashed moisture and from direct impingement of cooling air flow which would tend to condense and freeze any moisture present on the brushes and brush holders.

It is a further object of my invention to provide such a ventilating structure which may be easily removed from the generator housing to allow inspection and replacement of brushes and rapidly reassembly of the end structure to the housing.

These and other objects of my invention are accomplished in one form thereof by providing a ventilating arrangement which may be rapidly disassembled and which comprises a sectional air blast cover having an opening therein for receiving impinging air flow and containing baffling means spaced from the inner walls of the air blast cover to provide air directing passages over the surfaces of the rotor and stator, but which prevents good heat transfer contact between the cooling air stream and the brushes and brush holders. Air directing means in the form of a circumferential flow fan is further provided to provide cooling air flow through the generator when the generator is loaded and the aircraft is not in flight. The air directing means cooperates with the baffling means to prevent impingement of the cooling air stream and splashing of moisture on the brushes and brush holders.

The features of the invention which are believed to be novel are set forth with particularity in the appended claims. The invention itself, however, both as to its organization and operation, together with further objects and advantages thereof may best be understood when taken in connection with the following drawing wherein:

Figure 1:
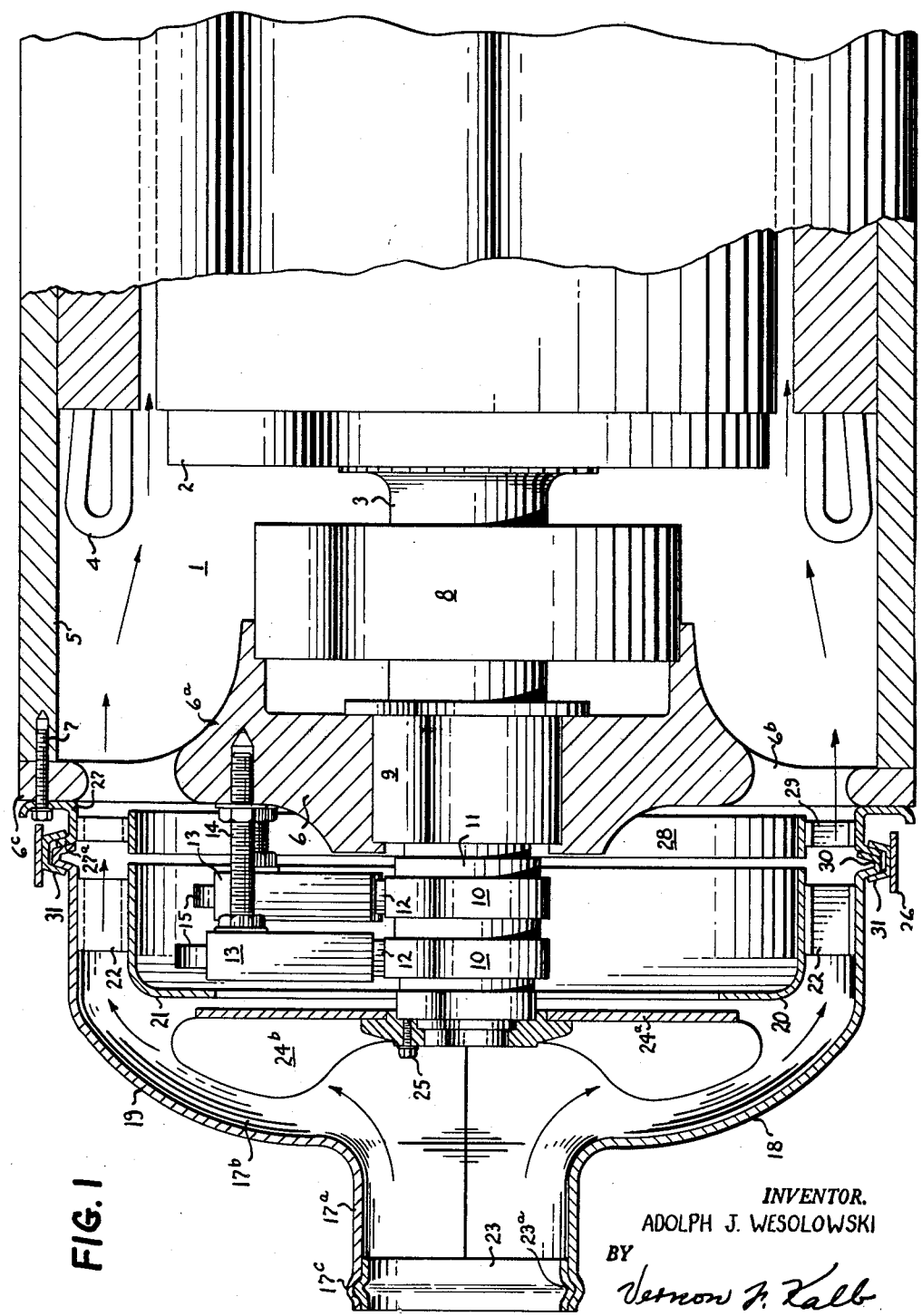
FIGURE 1 illustrates an elevation view, partially in section, of a generator embodying my invention.
Figure 2:
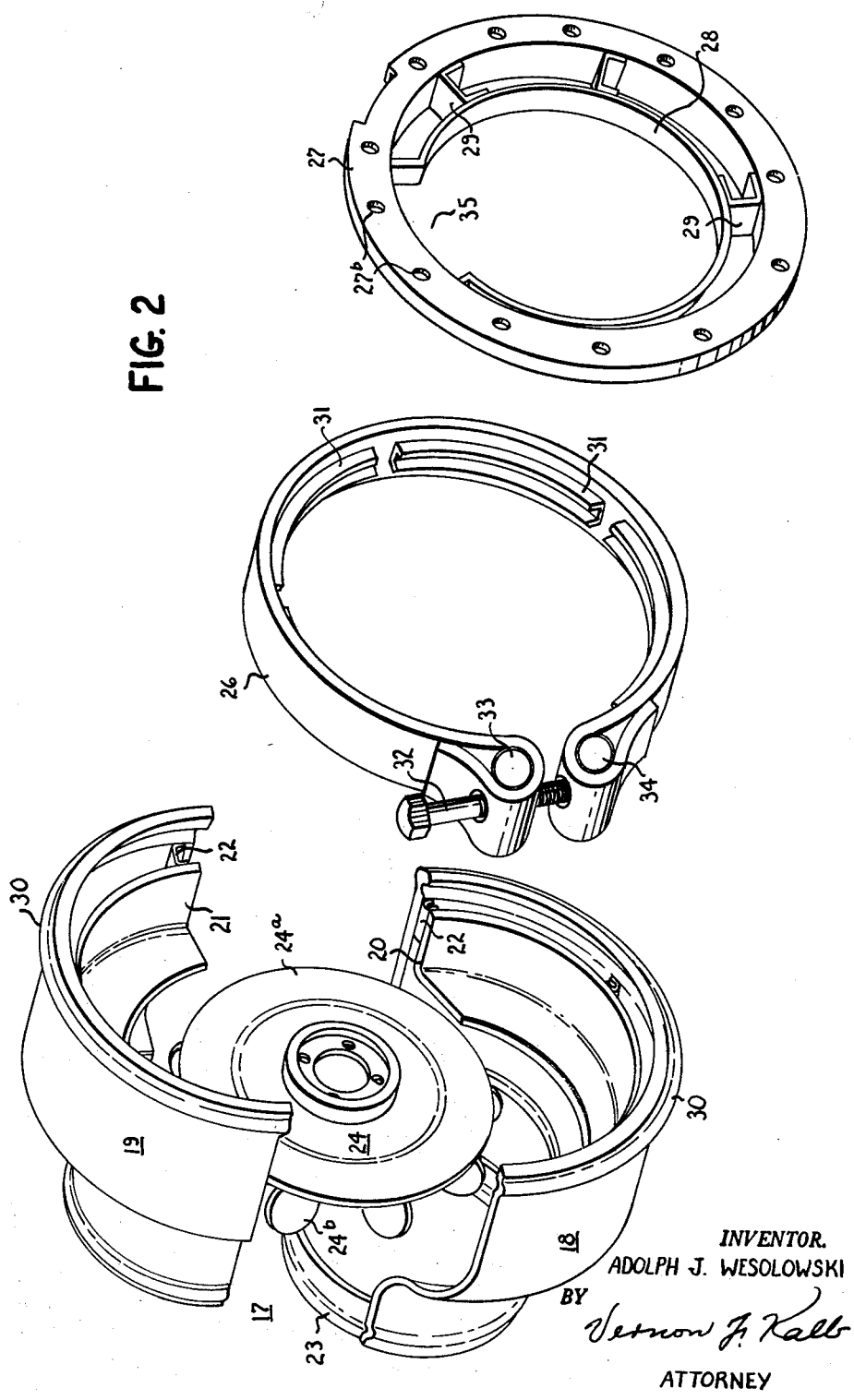
FIGURE 2 is an isometric exploded view of a generator end structure embodying the present invention.

The description of the invention which follows assumes the generator to be mounted on an aircraft by suitable mounting means. Reference is now made to FIGS. 1 and 2 where like identifying numerals identify like parts. I show a dynamoelectric machine 1 having a rotor 2 mounted on a shaft 3 adapted for rotation, and having a stator 4. The stator 4 is mounted within the machine housing which comprises an annular housing member 5 and an end housing member 6 having a hub portion 6a and spoke members 6b which extend from the hub portion 6a to the rim 6c. Therein 6c is bolted to member 5 by means of bolts 7. The generator may include a small exciter 8 mounted on the shaft 3 having an armature adapted to rotate therewith. The shaft 3 is journaled in the end member 6 by means of a bearing assembly 9. A collector assembly comprising slip rings 10 is mounted on the end of the shaft 3 on an insulator 11. Brushes 12 are carried by brush holders 13 which are mounted from end housing 6, as for example, by means of bolts 14. The brush holders are suitably insulated from the housing. Spring members 15 are provided to maintain the brushes 12 in contact with the slip rings 10. The springs 15 may be secured at one end to the brush holders or other mounting means, and the other ends exert force on the brushes 12, urging them into contact with the slip rings 10. Although it is not shown, it is to be understood that the brushes 12 are electrically connected to an electric circuit on the rotor 2. Exciting current is supplied to the slip rings from the exciter 8 by suitable electric connections, not shown.

In accordance with my invention, I provide improved means for directing ventilating air flow over the surfaces of the rotor 2 and the stator 4 along the paths generally indicated by the arrows, while preventing impingement of the air stream on the brush holder-brush assembly and good heat transfer relation between the air stream and brushes and brush holders. These features are realized by provision of an air blast cover 17 having, when assembled, a nozzle portion 17a which flares into a portion 17b of increasing diameter. The nozzle portion 17a is made a predetermined length and diameter to accommodate engagement and/or clamping of an air stream conduit thereto to conduct the cooling air stream to the generator. This design is dictated by the location of the generator in the aircraft. By design of aircraft, it is not usually feasible to mount the generator in proximity to an air scoop to receive a direct blast of air or to provide a separate air scoop for the generator. The opposite end of the generator housing, not shown, has vents therein to allow the cooling air stream to exit. The end of the shaft 3 not shown is geared or splined to drive powered by a prime mover of the aircraft.

The air blast cover 17 comprises mating segments 18 and 19 which form the cover when joined. Semi-annular baffling members 20 and 21 are supported by and spaced from segments 18 and 19 respectively by spacers 22 which may be spot welded between segments 18, 19 and members 20, 21 respectively. An annular member 23 is secured to one of the segments, for example, segment 18 to lend rigidity to the air blast cover 17 when assembled. The member 23 has a ridge 23a thereon which mates with a corresponding ridge 17c on the cover 17 which provides means for aiding in clamping a flexible conduit to nozzle 17a and mating segments 18 and 19 upon assembly. The members 20 and 21, when segments 18 and 19 are assembled, form an annular baffle within the air blast cover having an opening therein. Fan member 24 having a circular plate portion 24a and blades 24b to centrifugally direct impinging air flow thereon is secured to the shaft 3 as by bolts 25. The fan member 24 directs impinging air flow through the annular passage formed by the interior surface of air blast cover 17 and baffle members 20 and 21 into the confines of the generator as indicated by the arrows. The plate 24a of the fan member shields the brush and brush holder assembly from impingement of the ventilating air blast thereon and also shields the brush and brusher holder assembly from being directly contacted by moisture. In conjunction with the baffle members 18 and 19, it additionally provides a shroud around the brushes and brush holders which prevents good heat transfer contact between the air stream and the brushes and brush holders, thus preventing too rapid a decrease in temperature of the area surrounding the brushes as the aircraft gains altitude and speed. The blades 24b centrifugally direct the air stream through the annular passage formed by the air blast cover 17 and the baffle members 20 and 21.

The air blast cover 17 is removably secured to the generator housing by means of a clamping band 26. In the disclosed structure I provide an adaptor 27 which is secured to housing member 6 by means of bolts 7 for attaching the air blast cover to the generator housing. The adaptor assembly includes a baffling and shrouding member 28 supported and spaced from adaptor 27 by spacers 29. The member 28 serves a similar purpose as members 20 and 21. The member 28 is not made completely annular in the illustrated embodiment of the invention, inasmuch as a recess 35 is provided to allow space for mounting a capacitor to filter out radio frequency noise generated in the exciter. The adaptor 27 has a flange 27a which mates with ridge 30 on cover 17 and which is secured thereto by clamping band 26 having channel-shaped sections 31 thereon which engage flange 27a and ridge 30 to secure cover 17 to adaptor 27 and hence to the generator housing member 6. The clamping band 26 may be tensioned by an arrangement of the type shown in Patents 2,874,440 or 2,874,411 assigned to the same assignee as the present invention, or other suitable tensioning device, desirably one that is light in weight and adapted for quick release.

The ventilating structure which I have disclosed may be easily disassembled from the housing by removing the strap 26 to remove the air blast cover 17 from the housing member 6 and then separating the sections 18 and 19 which also separates and removes the baffling members 20 and 21 to leave the brush and brush holders exposed to allow inspection and replacement of the brushes or adjustment of the force exerted on the brushes by the springs 15. To reassemble, the sections 19 and 20 carrying baffle members 21 and 22 are placed over the fan member 24 and the brush and brush holder assembly, the flange 27a and ridge 30 on the air blast cover 17 are joined and the banding strap 26 together with channel-like members 31 are placed about flange 27a and ridge 30 and tensioned to secure the air blast cover 17 to member 27.

The ease of assembly and disassembly is particularly illustrated by FIG. 2. The adaptor 27 is not designed for quick removal, being bolted to rim 6c of housing member 6 and housing member 5 by means of bolts 7 through holes 27b. In some structures the air blast cover may be designed to be clamped directly to the housing eliminating need for an adaptor. The clamping band 26 is most clearly illustrated in FIG. 2. It may be seen that the clamping band 26 is readily tensionable by means of bolt 32 and nuts 33 and 34.

The disclosed structure serves two major functions. It provides efficient directing of the cooling air stream and prevents icing of the brushes and brush holders. In addition, it may be quickly removed from the generator in the manner described and rapidly replaced on the generator, thus allowing rapid inspection of the brushes and brush holders and adjustment thereof.

When an aircraft carrying the generator is airborne, there is no problem in deriving the needed air stream of cooling air, when the aircraft is on the ground and the prime mover driving the generator is idling, the fan 24 causes sufficient air flow in the direction of the arrows to remove the geat generated.

While I have illustrated and described an end structure embodying my invention for a generator, it will be apparent that my invention may be applicable to other types of dynamoelectric machines designed for airborne usage. Although a specific structure has been illustrated and described, changes and modifications to the disclosed structure may occur to others which do not depart from the spirit and scope of the invention. Accordingly, it is my intention to cover in the appended claims all changes and modifications of the disclosed structure which do not constitute departures from the spirit and scope of the invention.

What I claim as new and desire to secure by Letters Patent of the United States is:

1. A ventilating end structure for generators designed for use on aircraft and cooled by a high velocity air stream passing through the generator, the generator having a shaft adapted to be driven by a prime mover at one end, a rotating electric circuit on the shaft, a housing member having a stationary electrical circuit thereon, a collector assembly including brush holders and brushes at the other end of the shaft electrically connected to the rotating electric circuit, said ventilating end structure comprising an air blast cover removably mounted on the collector end of the housing, said cover having a nozzle portion defining an air stream admitting opening and flaring into a larger diameter portion, air flow baffling means supported and spaced from the interior of the large diameter portion of said cover and forming with said cover an annular passage for flow of the air stream around said collector assembly, air flow directing means mounted within said cover adjacent said opening to shield said collector assembly from impinging air flow and moisture introduced into said opening, said baffling means being arranged to direct the air stream over the electrical circuits of the generator and to cooperate with said air directing means to form a shroud about said collector assembly to prevent good heat exchange relationship between the cooling air stream and said collector assembly.

2. A ventilating end structure for generators designed for use on aircraft and cooled by a high velocity air stream passing through the generator, the generator having a shaft adapted to be driven by a prime mover at one end, a rotating electric circuit on the shaft, a housing member having a stationary electrical circuit thereon, a collector assembly including brush holders and brushes at the other end of the shaft electrically connected to the rotating electric circuit, said ventilating end structure comprising an air blast cover arranged to be removably fastened on the collector end of the housing, said cover comprising mating segments which form a nozzle portion defining an air stream admitting opening and flaring into a larger diameter portion, means for removably mounting said cover to the housing, air flow baffling members supported and spaced from the interior of the large diameter portion of each of said cover segments and forming with said cover an annular passage for flow of the air stream around said collector assembly, air flow directing means mounted within said cover adjacent said opening to shield said collector assembly from impinging air flow and moisture introduced into said opening, said baffling means being arranged to direct the air stream over the electrical circuits of the generator and to cooperate with said air directing means to form a shroud about said collector assembly to prevent good heat exchange relationship between the cooling air stream and said collector assembly.

3. A ventilating end sructure for generators designed for use on aircraft and cooled by a high velocity air stream passing through the generator, the generator having a shaft adapted to be driven by a prime mover at one end, a rotating electric circuit on the shaft, a housing member having a stationary electrical circuit thereon, a collector assembly including brush holders and brushes at the other end of the shaft electrically connected to the rotating electric circuit, said ventilating end structure comprising an air blast cover arranged to be mounted on the collector end of the housing, said cover comprising mating segments which form a nozzle portion defining an air stream admitting opening and flaring into a larger diameter portion, means for clamping said cover to the housing, air flow baffling means supported and spaced from the interior of the large diameter portion of each of said cover segments forming with said cover an annular passage for flow of the air stream around said collector assembly, air flow directing means mounted within said cover adjacent said opening to shield said collector assembly from impinging air flow and moisture introduced into said opening, said directing means comprising a plate member secured to the shaft to rotate therewith and having fan blades thereon to circumferentially direct an impinging air stream to the annular passage, said baffling means being arranged to direct the air stream over the electrical circuits of the generator and to cooperate with said air directing means to form a shroud about said collector assembly to prevent good heat exchange relationship between the cooling air stream and said collector assembly.

4. A generator for use on aircraft having a shaft adapted to be driven by a prime mover, said shaft having a rotating electric circuit thereon, a housing member having a stationary electric circuit thereon, a collector assembly including brushes and brush holders on one end of said shaft electrically connected to the rotating electric circuit, an air blast cover mounted on the collector end of said housing having an opening therein for introduction of a cooling air stream into the generator, air flow baffling means supported and spaced from said cover and forming an annular passage for flow of air around said collector assembly, air flow directing means mounted within said cover and shielding said collector assembly from impinging air flow and moisture introduced into the opening, said baffling means arranged to direct cooling air flow over the electrical circuits of the generator and to cooperate with said air directing means to form a shroud about said collector assembly to prevent good heat exchange relationship between the cooling air stream and said collector assembly.

5. A generator designed for use on aircraft having a shaft adapted to be driven by a prime mover, said shaft having an electric circuit thereon, a housing member having a stationary electric circuit thereon, a collector assembly including brushes and brush holders on one end of said shaft electrically connected to the rotating electrical circuit, an air blast cover removably mounted on the collector end of said housing, said cover comprising mating segments which form a nozzle portion defining an air stream admitting portion and flaring into a larger diameter portion, means for securing said cover to the housing member, air flow baffling means supported and spaced from said cover segments and forming an annular passage for flow of air around said collector assembly, air flow directing means mounted within said cover and shielding said collector assembly from impinging air flow and moisture introduced into the opening, said baffling means arranged to direct cooling air flow over the electrical circuits of the generator and to cooperate with said air directing means to form a shroud about said collector assembly to prevent good heat exchange relationship between the cooling air stream and said collector assembly.

References Cited in the file of this patent

UNITED STATES PATENTS 1,141,860     Balcome _____ June 1, 1915

FOREIGN PATENTS 730,059     Great Britain _____ May 18, 1955
1,160,476     France _____ Mar. 3, 1958